United States Patent
Pritchard et al.

(10) Patent No.: US 10,400,876 B1
(45) Date of Patent: Sep. 3, 2019

(54) POWER TRANSMITTING COMPONENT FOR A VEHICLE DRIVELINE HAVING A DIFFERENTIAL INSIDE A COMPOUND GEARSET

(71) Applicant: BorgWarner Inc., Auburn Hills, MI (US)

(72) Inventors: Larry A. Pritchard, Macomb, MI (US); Philip J. Francis, Lapeer, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 15/894,047

(22) Filed: Feb. 12, 2018

(51) Int. Cl.
*F16H 48/11* (2012.01)
*F16H 48/10* (2012.01)

(52) U.S. Cl.
CPC ........ *F16H 48/11* (2013.01); *F16H 2048/106* (2013.01); *F16H 2048/108* (2013.01)

(58) Field of Classification Search
CPC .............. F16H 48/11; F16H 2048/106; F16H 2048/108
See application file for complete search history.

(56) References Cited

U.S. PATENT DOCUMENTS

| | | | |
|---|---|---|---|
| 5,176,591 A * | 1/1993 | Krisher | F16H 48/10 180/247 |
| 6,484,834 B2 * | 11/2002 | Bowen | B60K 6/365 180/65.6 |
| 6,878,089 B2 | 4/2005 | Severinsson | |
| 7,497,286 B2 | 3/2009 | Keller et al. | |
| 8,083,636 B2 | 12/2011 | Showalter | |
| 8,308,594 B2 | 11/2012 | Grosser | |
| 8,672,790 B2 | 3/2014 | Severinsson et al. | |
| 9,120,479 B2 | 9/2015 | Severinsson | |
| 9,242,538 B2 | 1/2016 | Severinsson | |
| 9,353,847 B2 | 5/2016 | Severinsson et al. | |
| 9,365,207 B2 | 6/2016 | Severinsson et al. | |
| 9,400,034 B1 | 7/2016 | Pritchard et al. | |
| 9,505,298 B2 | 11/2016 | Fraser et al. | |
| 9,566,857 B1 | 2/2017 | Pritchard et al. | |
| 9,657,826 B1 | 5/2017 | Morgan | |
| 9,744,850 B2 | 8/2017 | Nilsson et al. | |
| 2002/0129979 A1 | 9/2002 | Bowen et al. | |
| 2003/0037976 A1 | 2/2003 | Bowen et al. | |

(Continued)

*Primary Examiner* — Edwin A Young
(74) *Attorney, Agent, or Firm* — Harness, Dickey & Pierce, P.L.C.

(57) ABSTRACT

A power transmitting component with a differential assembly and a planetary reduction that has a plurality of compound planet gears. Each of the compound planet gears is rotatable about a rotary planet axis and has first and second planet gears that are nonrotatably coupled to one another and spaced axially apart from one another along an associated one of the rotary planet axes. The rotary planet axes are disposed concentrically about a rotational axis of the input to the planetary reduction. Each of the first planet gears is meshingly engaged to the input of the planetary reduction, while each of second planet gears is meshingly engaged with a stationary ring gear. The differential assembly receives rotary power from the planetary reduction and has first and second differential outputs that are disposed along the rotational axis between the first and second planet gears.

18 Claims, 4 Drawing Sheets

(56) References Cited

U.S. PATENT DOCUMENTS

| | | | |
|---|---|---|---|
| 2004/0220011 A1* | 11/2004 | Gumpoltsberger | B60K 17/16 475/205 |
| 2009/0112430 A1 | 4/2009 | Showalter | |
| 2011/0015020 A1 | 1/2011 | Grosser | |
| 2011/0039650 A1* | 2/2011 | Rosemeier | B60K 6/52 475/149 |
| 2013/0252777 A1* | 9/2013 | Biermann | F16H 48/05 475/221 |
| 2013/0269305 A1 | 10/2013 | Wang et al. | |
| 2013/0281250 A1 | 10/2013 | Severinsson et al. | |
| 2013/0297125 A1 | 11/2013 | Syed et al. | |
| 2014/0148307 A1 | 5/2014 | Severinsson | |
| 2014/0283648 A1 | 9/2014 | Severinsson | |
| 2015/0151634 A1* | 6/2015 | Smetana | B60K 1/02 475/150 |
| 2015/0330493 A1 | 11/2015 | Pritchard | |
| 2016/0207396 A1 | 7/2016 | Pritchard et al. | |
| 2017/0050508 A1 | 2/2017 | Pritchard et al. | |
| 2017/0151872 A1 | 6/2017 | Nilsson et al. | |
| 2017/0248045 A1 | 8/2017 | Pritchard et al. | |
| 2017/0254396 A1 | 9/2017 | Pritchard et al. | |
| 2017/0261082 A1 | 9/2017 | Pritchard et al. | |
| 2018/0010682 A1 | 1/2018 | Pritchard et al. | |

* cited by examiner

POWER TRANSMITTING COMPONENT FOR A VEHICLE DRIVELINE HAVING A DIFFERENTIAL INSIDE A COMPOUND GEARSET

FIELD

The present disclosure relates to a power transmitting component for a vehicle driveline having a differential inside a compound gearset.

BACKGROUND

This section provides background information related to the present disclosure which is not necessarily prior art.

U.S. Patent Application Publication No. 2015/0151634 discloses a an electric axle for a vehicle that includes an electric motor, a reduction gear section, a torque-distributing differential and two output shafts that are configured to drive a pair of vehicle wheels. In a manner that is well known in the art, the electric motor, the reduction gear section, the torque-distributing differential and the output shafts are disposed coaxially about a main transmission axis. The reduction gear section and the torque-distributing differential are relatively large, and consequently it can be difficult to package the electric axle into a vehicle in some situations.

SUMMARY

This section provides a general summary of the disclosure, and is not a comprehensive disclosure of its full scope or all of its features.

In one form, the present disclosure provides a power transmitting component for a vehicle driveline that includes a housing, a planet carrier, an input sun gear, a first output sun gear, a second output sun gear, a ring gear, a plurality of compound planet gears that each have a first planet gear and a second planet gear, a plurality of third planet gears and a plurality of fourth planet gears. The planet carrier is disposed in the housing for rotation relative to the housing about an axis. The planet carrier has a carrier body and sets of first, second and third pins. Each of the first pins is disposed circumferentially about the carrier body. Each of the second pins is disposed circumferentially about the carrier body. Each of the third pins is disposed circumferentially about the carrier body. The input sun gear disposed in the carrier body for rotation about the axis relative to the planet carrier. The first output sun gear is disposed in the carrier body for rotation about the axis relative to the planet carrier. The second output sun gear is disposed in the carrier body for rotation about the axis relative to the planet carrier. The ring gear is non-rotatably coupled to the housing. Each of the compound planet gears is received in the carrier body and rotatably disposed on an associated one of the first pins. The first planet gear of each of the compound planet gears is meshingly engaged to the input sun gear, while the second planet gear of each of the compound planet gears is non-rotatably coupled to the first planet gear and meshingly engaged to the ring gear. Each of the third planet gears is rotatably disposed on an associated one of the second pins and is meshingly engaged with the first output sun gear. Each of the fourth planet gears is rotatably disposed on an associated one of the third pins and is meshingly engaged with the second output sun gear and a corresponding one of the third planet gears.

In another form, the present disclosure provides a power transmitting component for a vehicle driveline that includes a housing, a planetary reduction and a differential assembly. The planetary reduction has a first sun gear, a planet carrier, a plurality of compound planet gears, and a ring gear. The first sun gear is rotatable about a rotational axis. Each of the compound planet gears being journally supported by the planet carrier so as to be rotatable relative to the planet carrier about a rotary planet axis. The rotary planet axes are disposed concentrically about the rotational axis of the first sun gear. Each of the compound planet gears has a first planet gear and a second planet gear that is spaced apart from the first planet gear along an associated one of the rotary planet axes. Each of the first planet gears is meshingly engaged to the first sun gear, while each of second planet gears is coupled to an associated one of the first planet gears for rotation therewith and meshingly engaged with the ring gear. The ring gear is fixedly coupled to the housing. The differential assembly receives rotary power from the planetary reduction and has first and second differential outputs that are disposed along the rotational axis between the first and second planet gears.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
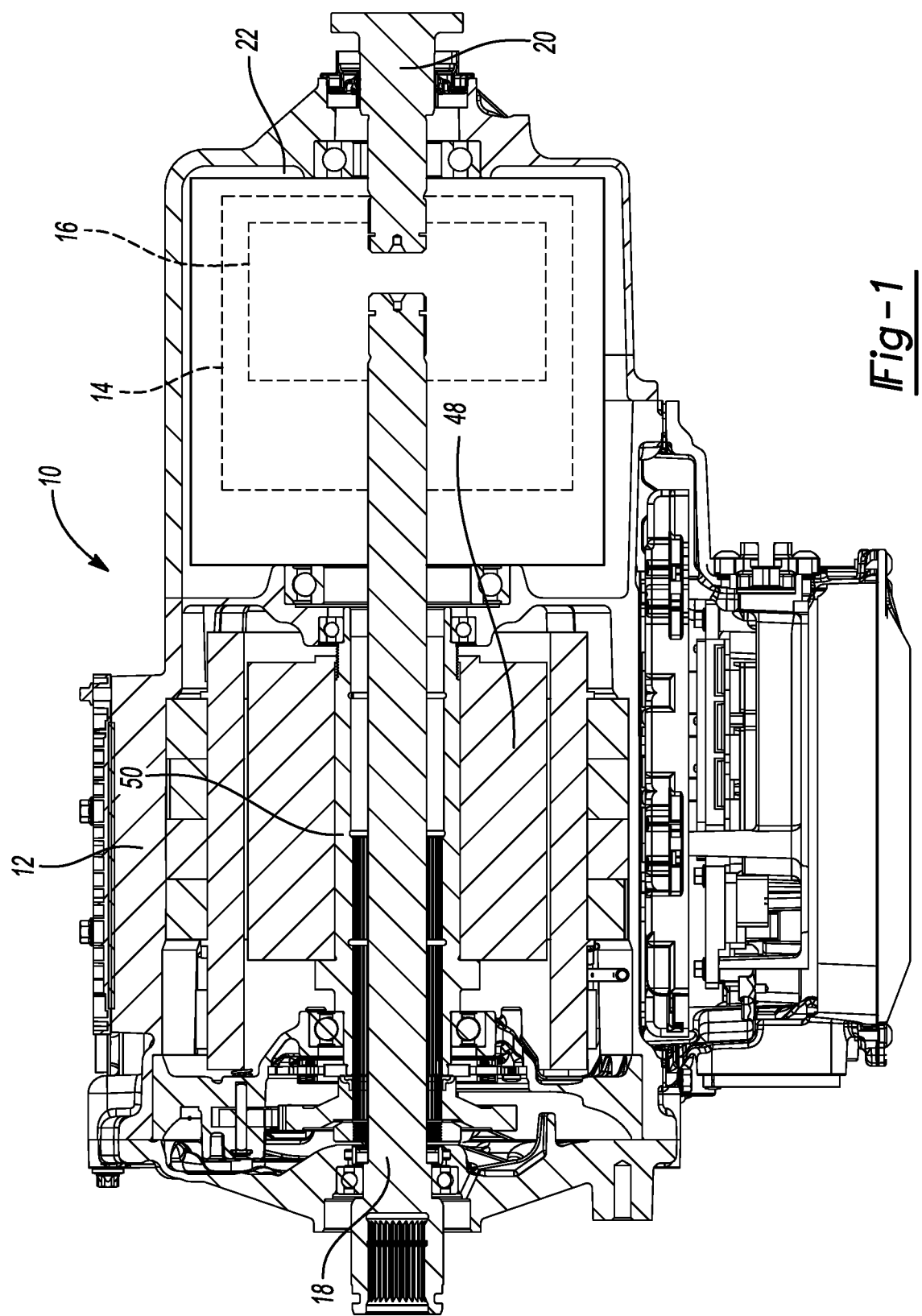
FIG. 1 is a longitudinal section view of an exemplary power transmitting component constructed in accordance with the teachings of the present disclosure.

With reference to FIG. 1 of the drawings, an exemplary power transmitting component for a vehicle driveline is generally indicated by reference numeral 10. The power transmitting component 10 is illustrated to be an axle assembly, but it will be appreciated that the power transmitting component could be configured somewhat differently.

The power transmitting component 10 can include a housing 12, a planetary reduction 14, a differential assembly 16 and first and second output shafts 18 and 20. The housing 12 can define a cavity 22 into which the planetary reduction 14 and the differential assembly 16 can be received.

Figure 2:
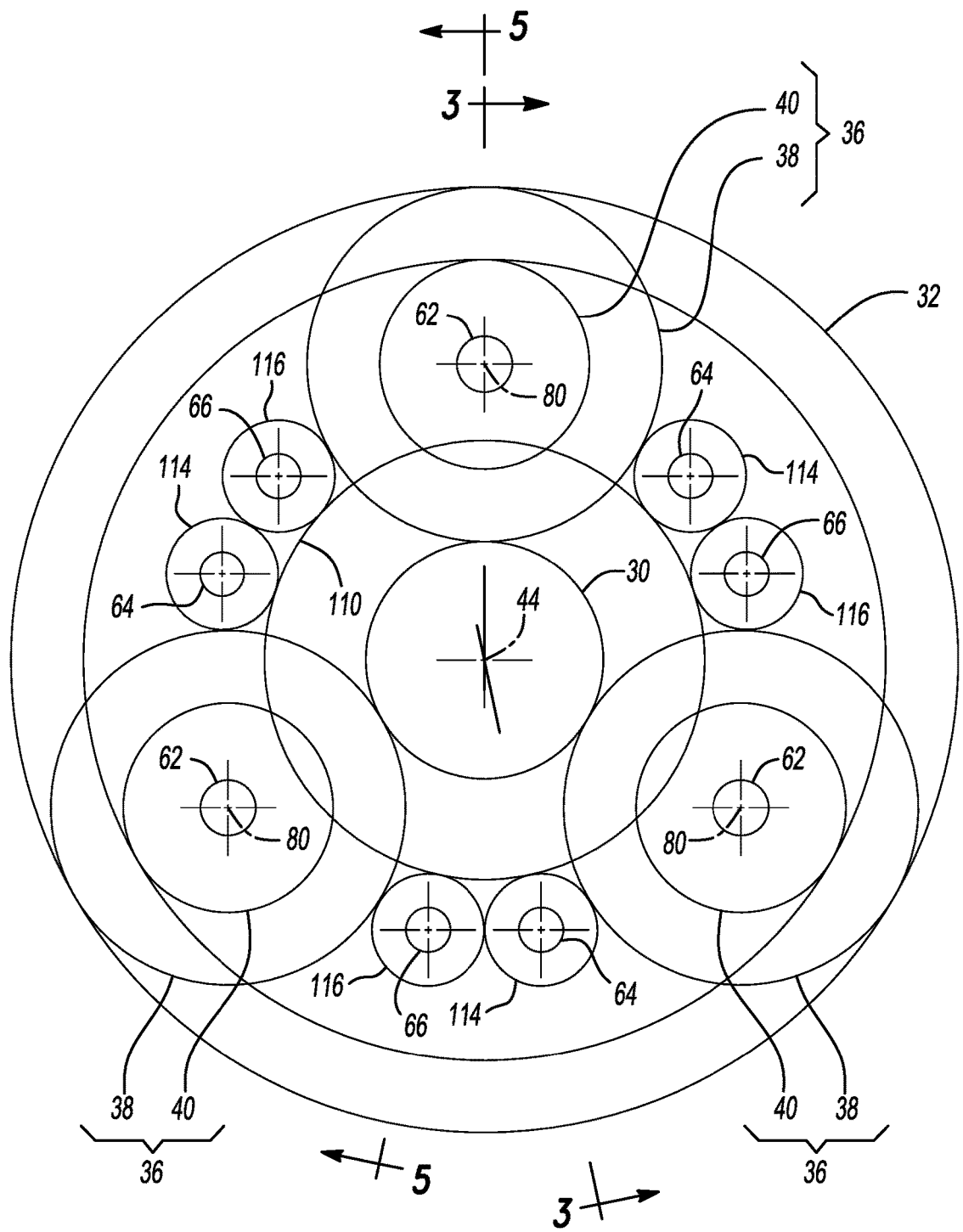
FIG. 2 is a schematic illustration of a portion of the power transmitting component of FIG. 1 illustrating a planetary reduction and a differential assembly in more detail.
Figure 3:
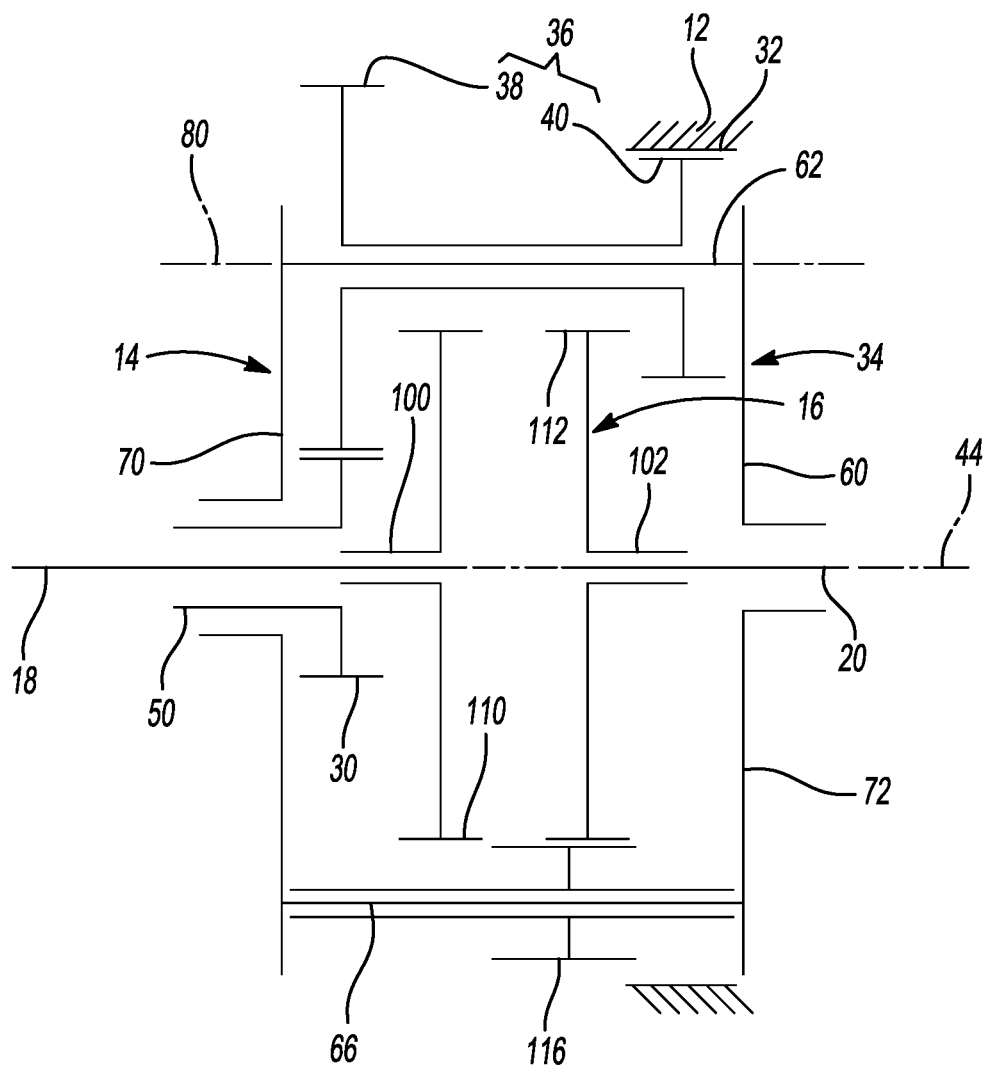
FIG. 3 is a section view taken along the line 3-3 of FIG. 2.
Figure 4:
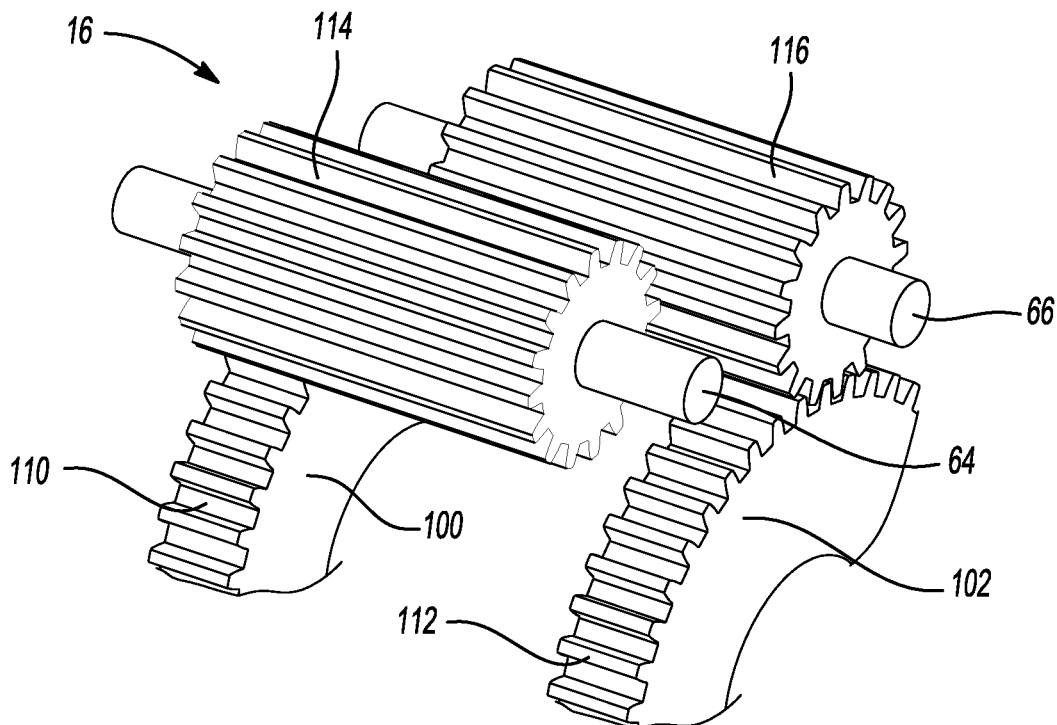
FIG. 4 is a perspective view of a portion of the power transmitting component of FIG. 1 illustrating a portion of the differential assembly in more detail.
Figure 5:
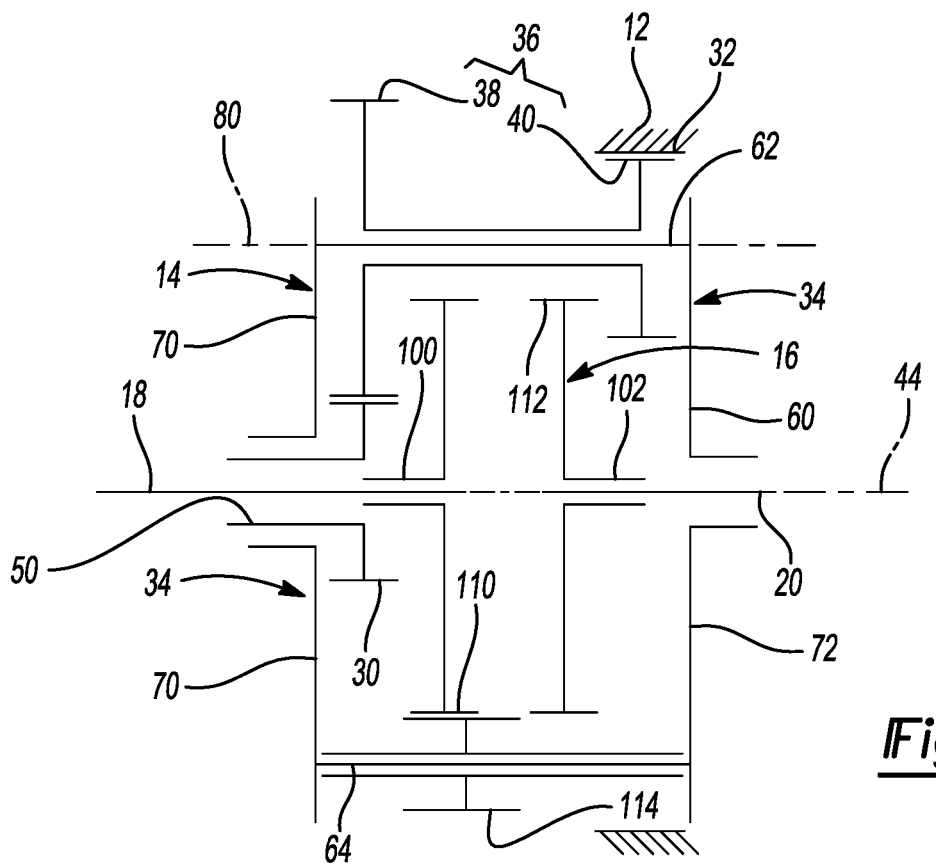
FIG. 5 is a section view taken along the line 5-5 of FIG. 2.

With reference to FIGS. 2 and 3, the planetary reduction 14 can have a first or input sun gear 30, a ring gear 32, a planet carrier 34, and a plurality of compound planet gears 36 each of which having a first planet gear 38 and a second planet gear 40. The first sun gear 30 is rotatable about a rotational (central) axis 44 and can receive power from an appropriate power source. In the example provided, the power source is an electric motor 48 (FIG. 1) having a hollow rotor shaft 50 that is coupled to the first sun gear 30 for common rotation about the central axis 44. The ring gear 32 can be disposed concentrically about the first sun gear 30 and can be non-rotatably coupled (e.g., fixedly coupled) to the housing 12.

The planet carrier 34 is disposed in the housing 12 for rotation relative to the housing 12 about the central axis 44. The planet carrier 34 has a carrier body 60, a set of first pins 62, a set of second pins 64 and a set of third pins 66. The carrier body 60 can include a first plate 70 and a second plate 72 that can be spaced apart from one another along the central axis 44. The first pins 62 can be fixedly coupled to the carrier body 60 (i.e., to one or typically both of the first and second plates 70 and 72) and can be disposed circumferentially about the carrier body 60 in a desired manner, such as spaced evenly about the central axis 44. The second pins 64 can be fixedly coupled to the carrier body 60 (i.e., to one or both of the first and second plates 70 and 72) and can be disposed circumferentially about the carrier body 60 in a desired manner, such as spaced evenly about the central axis 44. The third pins 66 can be fixedly coupled to the carrier body 60 (i.e., to one or both of the first and second plates 70 and 72) and can be disposed circumferentially about the carrier body 60 in a desired manner, such as spaced evenly about the central axis 44. While sets of the first pins 62, the second pins 64 and the third pins 66 have been described as each employing a common angular spacing between associated pins in the set, it will be appreciated that different spacings may be employed in one or more of the sets, for example to attenuate noise produced by the planetary reduction 14 during operation of the power transmitting component 10.

Each of the compound planet gears 36 can be being received in the carrier body 60 (i.e., between the first and second plates 70 and 72) and can be rotatably disposed on an associated one of the first pins 62 so as to be rotatable relative to the planet carrier 34 about a rotary planet axis 80. It will be appreciated that each rotary planet axis 80 is coincident with a longitudinal axis of an associated one of the first pins 62 and as such, the rotary planet axes 80 are disposed concentrically about the central axis 44. As noted above, each of the compound planet gears 36 has a first planet gear 38 and a second planet gear 40. The first and second planet gears 38 and 40 of each compound planet gear 36 can be spaced apart from one another along an associated one of the rotary planet axes 80 and can be rotatably coupled (e.g., fixedly coupled) to one another. The first planet gears 38 can be meshingly engaged to the first sun gear 30, while the second planet gears 40 can be meshingly engaged to the (stationary) ring gear 32.

With reference to FIGS. 2 through 5, the differential assembly 16 can receive rotary power from the planetary reduction 14 and can have first and second differential outputs 100 and 102, respectively. The first output shaft 18, which is optional, can be coupled to the first differential output 100 for rotation therewith and can extend along the central axis 44 through the input sun gear 30 and the hollow rotor shaft 50. The second output shaft 20, which is also optional, can be coupled to the second differential output 102 for rotation therewith. Any means for distributing power may be employed for the differential assembly 16, including a bevel gearset, a helical gearset, and/or one or more friction clutches. The first and second differential outputs 100 and 102 can be rotatable relative to the planet carrier 34 and can be disposed along the central axis 44 between the first planet gears 38 and the second planet gears 40.

In the example provided, the differential assembly 16 comprises a planetary gearset, the first differential output 100 comprises a second sun gear or first output sun gear 110 that is rotatable about the central axis 44, the second differential output 102 comprises a third sun gear or second output sun gear 112 that is rotatable about the central axis 44, and the differential assembly 16 further comprises a plurality of third planet gears 114 and a plurality of fourth planet gears 116. Each of the third planet gears 114 can be rotatably disposed on an associated one of the second pins 64 and can be meshingly engaged with the first output sun gear/second sun gear 110. Each of the fourth planet gears 116 can be rotatably disposed on an associated one of the third pins 66 and can be meshingly engaged with the second output sun gear/third sun gear 112 and a corresponding one of the third planet gears 114. In this regard, each of the third planet gears 114 is meshingly engaged to not only the first output sun gear/second sun gear 110 but also to one of the fourth planet gears 116.

In the example provided, the input sun gear 30, the second planet gears 40 and the first and second sun gears 30 and 110 are spur gears, but it will be appreciated that one or more of these gears could be configured as a helical gear.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component for a vehicle driveline, the power transmitting component comprising:
   a housing;
   a planet carrier disposed in the housing for rotation relative to the housing about an axis, the planet carrier having a carrier body and sets of first, second and third pins, each of the first pins being disposed circumferentially about the carrier body, each of the second pins being disposed circumferentially about the carrier body, each of the third pins being disposed circumferentially about the carrier body;
   an input sun gear disposed in the carrier body for rotation about the axis relative to the planet carrier;
   a first output sun gear disposed in the carrier body for rotation about the axis relative to the planet carrier;
   a second output sun gear disposed in the carrier body for rotation about the axis relative to the planet carrier;
   a ring gear non-rotatably coupled to the housing;
   a plurality of compound planet gears, each of the compound planet gears being received in the carrier body and rotatably disposed on an associated one of the first pins, each of the compound planet gears having a first planet gear, which is meshingly engaged to the input sun gear, and a second planet gear that is non-rotatably coupled to the first planet gear and meshingly engaged to the ring gear;
   a plurality of third planet gears, each of the third planet gears being rotatably disposed on an associated one of the second pins and being meshingly engaged with the first output sun gear; and a plurality of fourth planet gears, each of the fourth planet gears being rotatably disposed on an associated one of the third pins and being meshingly engaged with the second output sun gear and a corresponding one of the third planet gears.

2. The power transmitting component of claim 1, wherein the input sun gear is a spur gear.

3. The power transmitting component of claim 1, wherein the second planet gear is a spur gear.

4. The power transmitting component of claim 1, wherein the first and second output sun gears are spur gears.

5. The power transmitting component of claim 1, further comprising a first output shaft, which is coupled to the first output sun gear for rotation therewith, and a second output shaft that is coupled to the second output sun gear for rotation therewith.

6. The power transmitting component of claim 5, wherein the first output shaft is received through the input sun gear.

7. The power transmitting component of claim 1, further comprising an electric motor drivingly coupled to the input sun gear.

8. The power transmitting component of claim 7, wherein the electric motor includes a hollow motor output shaft that is disposed about an output shaft that is rotatably coupled to the first output sun gear.

9. A power transmitting component for a vehicle driveline, the power transmitting component comprising:
a housing;
a planetary reduction having a first sun gear, a planet carrier, a plurality of compound planet gears, and a ring gear, the first sun gear being rotatable about a rotational axis, each of the compound planet gears being journally supported by the planet carrier so as to be rotatable relative to the planet carrier about a rotary planet axis, the rotary planet axes being disposed concentrically about the rotational axis of the first sun gear, each of the compound planet gears having a first planet gear and a second planet gear that is spaced apart from the first planet gear along an associated one of the rotary planet axes, each of the first planet gears being meshingly engaged to the first sun gear, each of second planet gears being coupled to an associated one of the first planet gears for rotation therewith and meshingly engaged with the ring gear, the ring gear being fixedly coupled to the housing;
a differential assembly receiving rotary power from the planetary reduction and having first and second differential outputs that are disposed along the rotational axis between the first and second planet gears.

10. The power transmitting component of claim 9, wherein the differential assembly comprises a planetary gearset and wherein the first and second differential outputs are second and third sun gears, respectively.

11. The power transmitting component of claim 10, wherein the planetary gearset comprises a plurality of third planet gears and a plurality of fourth planet gears, each of the third planet gears being journally supported by the planet carrier and being meshingly engaged to the second sun gear, each of the fourth planet gears being journally supported by the planet carrier and being meshingly engaged to the third sun gear and an associated one of the third planet gears.

12. The power transmitting component of claim 10, wherein the second and third sun gears are spur gears.

13. The power transmitting component of claim 10, wherein the first sun gear is a spur gear.

14. The power transmitting component of claim 10, wherein the second planet gear is a spur gear.

15. The power transmitting component of claim 10, further comprising a first output shaft, which is coupled to the first differential output for rotation therewith, and a second output shaft that is coupled to the second differential output for rotation therewith.

16. The power transmitting component of claim 15, wherein the first output shaft is received through the first sun gear.

17. The power transmitting component of claim 10, further comprising an electric motor drivingly coupled to the first sun gear.

18. The power transmitting component of claim 17, wherein the electric motor includes a hollow rotor shaft that is disposed about an output shaft that is rotatably coupled to the first differential output.

\* \* \* \* \*